US009614409B2

(12) United States Patent
Jang et al.

(10) Patent No.: US 9,614,409 B2
(45) Date of Patent: Apr. 4, 2017

(54) MOTOR WITH HALL SENSOR COVER AND WATERPROOF COVER

(71) Applicant: NEW MOTECH CO., LTD., Gwangju (KR)

(72) Inventors: Jeong Cheol Jang, Gwangju (KR); Jeong Nam Seo, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 178 days.

(21) Appl. No.: 14/415,598

(22) PCT Filed: Jun. 24, 2013

(86) PCT No.: PCT/KR2013/005550
§ 371 (c)(1),
(2) Date: Jan. 18, 2015

(87) PCT Pub. No.: WO2014/042340
PCT Pub. Date: Mar. 20, 2014

(65) Prior Publication Data
US 2015/0214807 A1 Jul. 30, 2015

(30) Foreign Application Priority Data
Sep. 17, 2012 (KR) .................... 10-2012-0102627

(51) Int. Cl.
H02K 5/10 (2006.01)
H02K 11/00 (2016.01)
(Continued)

(52) U.S. Cl.
CPC .............. *H02K 5/10* (2013.01); *H02K 1/14* (2013.01); *H02K 11/215* (2016.01); *H02K 29/08* (2013.01)

(58) Field of Classification Search
CPC .... H02K 5/10; H02K 11/0021; H02K 11/215; H02K 29/08; H02K 1/14
(Continued)

(56) References Cited

U.S. PATENT DOCUMENTS 6,992,417 B1 * 1/2006 Yamada ................. H02K 3/522
310/194
7,459,812 B2 * 12/2008 Choi ...................... H02K 1/148
310/216.074
(Continued)

FOREIGN PATENT DOCUMENTS

KR  10-1999-0052144 A   7/1999
KR     10-0254613 B1    5/2000
(Continued)

OTHER PUBLICATIONS

International Search Report for PCT/KR2013/005550 mailed Sep. 25, 2013 from Korean Intellectual Property Office.

Primary Examiner — John K Kim
(74) Attorney, Agent, or Firm — Revolution IP, PLLC

(57) ABSTRACT

In a motor according to the present invention configured of a stator core having a plurality of teeth formed in a radial shape and an upper insulator and a lower insulator surrounding an upper portion and a lower portion of the stator core, the motor includes a hall sensor cover combined on a top of the teeth of the upper insulator and having a plurality of hall sensors, and a hall sensor resting unit for resting lower end portions of the hall sensors is formed on a top of one end portions of the teeth of the upper insulator.

4 Claims, 3 Drawing Sheets

(51) Int. Cl.
  *H02K 29/08* (2006.01)
  *H02K 11/215* (2016.01)
  *H02K 1/14* (2006.01)

(58) Field of Classification Search
  USPC .............................. 310/43, 68 B, 71, 88, 194
  IPC ................................................. H02K 5/10,11/00
  See application file for complete search history.

(56) References Cited

U.S. PATENT DOCUMENTS

| | | | | |
|---|---|---|---|---|
| 8,247,935 B2* | 8/2012 | Onozawa | ............... | H02K 29/08 310/156.05 |
| 8,253,284 B2* | 8/2012 | Sagara | ................ | B60L 11/1877 310/43 |
| 8,415,846 B2* | 4/2013 | Best | .......... | H02K 5/10 310/43 |
| 8,450,898 B2* | 5/2013 | Sears | ..................... | H02K 3/522 310/194 |
| 8,476,795 B2* | 7/2013 | Wakabayashi | ......... | H02K 29/08 310/68 B |
| 2009/0324435 A1* | 12/2009 | Sears | ..................... | H02K 3/522 417/423.7 |
| 2010/0187920 A1 | 7/2010 | Best et al. | | |
| 2012/0119607 A1* | 5/2012 | Chen | ..................... | H02K 1/148 310/208 |
| 2015/0214807 A1* | 7/2015 | Jang | ........................ | H02K 5/10 310/68 B |

FOREIGN PATENT DOCUMENTS

| | | |
|---|---|---|
| KR | 10-2005-0067914 A | 7/2005 |
| KR | 10-2008-0044120 A | 5/2008 |
| KR | 10-2008-0081412 A | 9/2008 |
| KR | 10-0898164 B1 | 5/2009 |

* cited by examiner

MOTOR WITH HALL SENSOR COVER AND WATERPROOF COVER

CROSS REFERENCE TO PRIOR APPLICATIONS

This application is a National Stage Application of PCT International Patent Application No. PCT/KR2013/005550 filed on Jun. 24, 2013, under 35 U.S.C. §371, which claims priority to Korean Patent Application No. 10-2012-0102627 filed on Sep. 17, 2012, which are all hereby incorporated by reference in their entirety.

TECHNICAL FIELD

The present invention relates to a motor. More specifically, the present invention relates to a motor which is more appropriate for miniaturization through a new structure of a hall sensor cover and capable of effectively blocking and draining moisture penetrating inside the motor through a new structure of a waterproof cover.

Generally, a motor used in a washing machine or the like has a hall sensor for measuring rotation speed of the motor by sensing changes in the magnetic field of a rotating rotor. A hall sensor cover is applied to install an insulator surrounding the stator core of a stator. The hall sensor is generally placed in a slot, which is a space between teeth of the stator core, and such a structure of the motor is disclosed in Korean Laid-opened Patent No. 10-2005-0067914.

According to the conventional structure shown in the Laid-opened Patent, if it is assumed that three hall sensors are installed, the three hall sensors should be installed in three slots, and thus the size of the hall sensor cover is increased to be larger the size of the three slots. Accordingly, since the size of the hall sensor cover should be larger than a certain size, it is difficult to miniaturize the motor.

Meanwhile, in the case of a motor applied to a washing machine, a washing tub is installed above the motor and rotates by the driving force of the motor. If water drops from above and penetrates into the motor when the washing tub rotates, the motor may have a problem of breakdown, malfunction or corrosion.

Therefore, in order to solve the aforementioned problems, the inventors of the present invention introduce a structure for installing at least two hall sensors at an end of a tooth and propose a motor of a new structure attaching a waterproof cover on the stator.

DISCLOSURE OF INVENTION

Technical Problem

Therefore, the present invention has been made in view of the above problems, and it is an object of the present invention to provide a motor in which the size of a hall sensor cover can be reduced through a new structure of the hall sensor cover.

Another object of the present invention is to provide a motor which can reduce manufacturing cost through miniaturization of the hall sensor cover.

Still another object of the present invention is to provide a motor having a waterproof cover that can prevent penetration of water falling from above the motor.

All of the above objects of the present invention and other inherent objects may be easily accomplished by the present invention described below.

Solution to Problem

In a motor according to the present invention configured of a stator core having a plurality of teeth formed in a radial shape and an upper insulator and a lower insulator surrounding an upper portion and a lower portion of the stator core, the motor includes a hall sensor cover combined on a top of the teeth of the upper insulator and having a plurality of hall sensors, and a hall sensor resting unit for resting lower end portions of the hall sensors is formed on a top of one end portions of the teeth of the upper insulator.

In the present invention, at least one fixing leg may be formed under the hall sensor cover, and a fixing projection may be formed on a top of at least one tooth of the upper insulator, in which the fixing projection may be coupled to a fixing hole formed at the fixing leg.

In the present invention, it is preferable that the motor further includes a waterproof cover combined on a top of the upper insulator, in which the waterproof cover has a flange unit having a hollow section at a center; and a cover unit formed around the flange unit to have a shape declined toward an outer circumference, and an opening section opened to expose the hall sensor cover is formed at one side of the cover unit.

In the present invention, the motor may further include a plurality of ribs formed to be projected on the cover unit toward the outer circumference.

In the present invention, the motor may further include a plurality of drain guides formed to be projected along the outer circumference of the cover unit, wherein a drain channel is formed between the drain guide and an adjacent drain guide.

According to another aspect of the present invention, there is provided a waterproof cover of a motor including: a flange unit having a hollow section at a center; a cover unit formed around the flange unit to have a shape declined toward an outer circumference; an opening section opened to expose a hall sensor cover at one side of the cover unit; a plurality of ribs formed to be projected on the cover unit toward the outer circumference; a plurality of drain guides formed to be projected along the outer circumference of the cover unit; and a drain channel formed between adjacent drain guides among the plurality of drain guides.

Advantageous Effects of Invention

The present invention has an effect of providing a motor which can miniaturize a hall sensor cover and save manufacturing cost furthermore through a new structure of the hall sensor cover and protect inside of the motor by applying a waterproof cover which can prevent penetration of water falling from above the motor.

MODE FOR THE INVENTION

The preferred embodiments of the present invention will be hereafter described in detail, with reference to the accompanying drawings.

Figure 1:
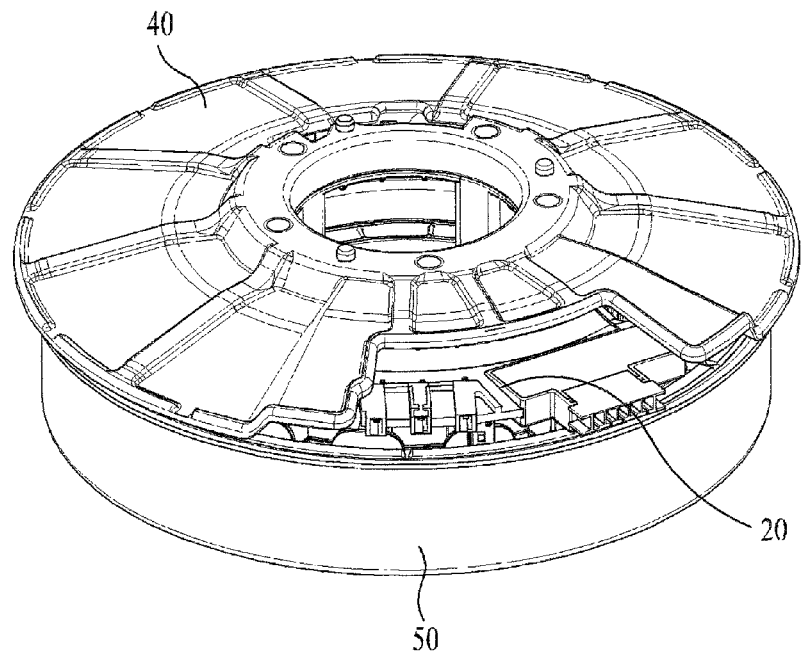
FIG. 1 is a perspective view showing a motor according to the present invention.

FIG. 1 is a perspective view showing a motor according to the present invention.

Figure 2:
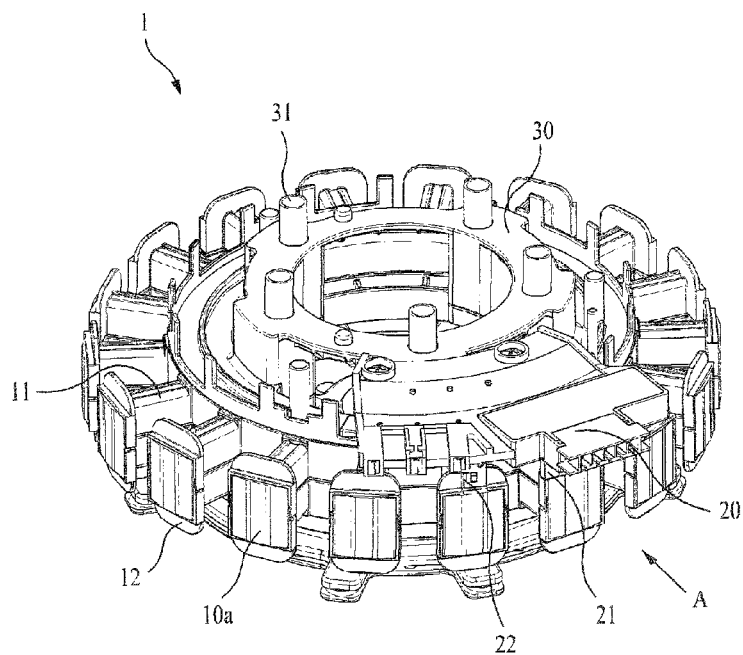
FIG. 2 is a perspective view showing a stator assembly of a motor according to the present invention.

As shown in FIG. 1, the motor according to the present invention includes a rotor housing 50, and the top of the rotor housing is covered with a waterproof cover 40. A stator assembly 1 shown in FIG. 2 is placed under the waterproof cover 40, and the stator assembly 1 includes a hall sensor cover 20. In FIG. 1, the hall sensor cover 20 is shown through an open portion of the waterproof cover 40.

The waterproof cover 40 prevents water from directly falling into the motor, i.e., into the stator assembly 1 placed under the waterproof cover 40, by flowing the water which may fall from the washing tub placed above the waterproof cover 40 toward the outer circumference of the waterproof cover 40. The waterproof cover 40 is preferably configured to have a diameter larger than the diameter of the rotor housing 50.

The hall sensor cover 20 includes a plurality of hall sensors for measuring strength of a magnetic field generated by a rotor magnet when the rotor rotates and may measure rotation speed of the motor. The present invention proposes a structure of a motor which can reduce the size of the hall sensor cover through a structure that can reduce the distance between the hall sensors. Detailed configuration thereof will be described below in detail with reference to FIGS. 2 to 5.

Figure 3:
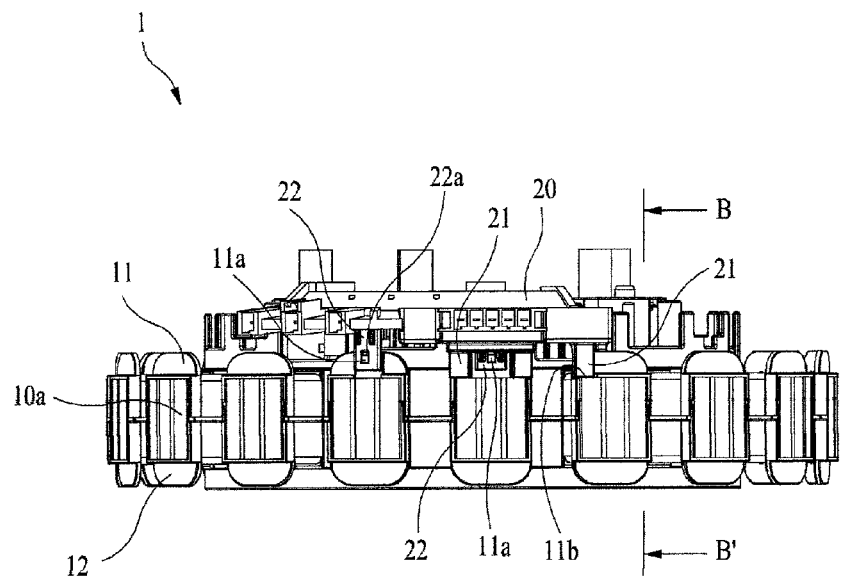
FIG. 3 is a front view shown from the direction A of FIG. 2.
Figure 4:
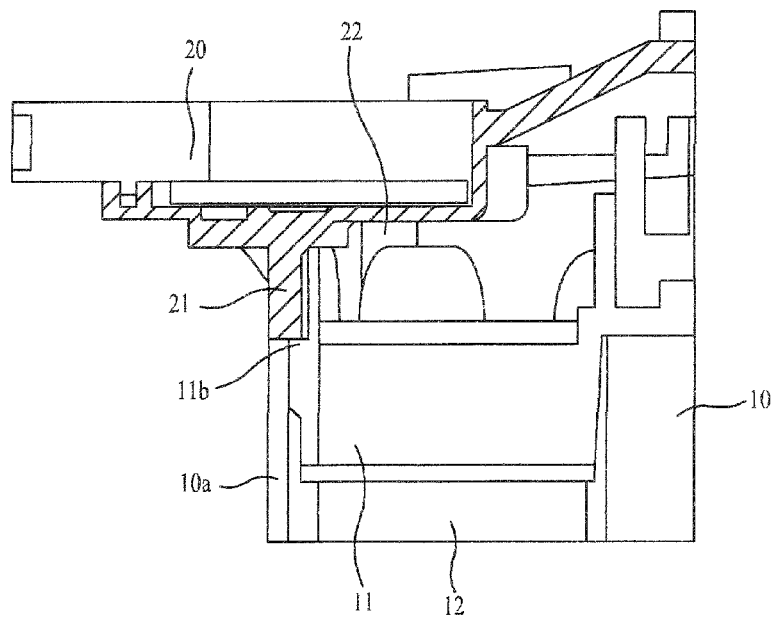
FIG. 4 is a cross-sectional view taken along the line B-B' of FIG. 3.

FIG. 2 is a perspective view showing a stator assembly 1 of a motor according to the present invention, FIG. 3 is a front view shown from the direction A of FIG. 2, and FIG. 4 is an exploded cross-sectional view taken along the line B-B' of FIG. 3.

Referring to FIGS. 2 to 4, the stator assembly 1 of a motor according to the present invention includes an upper insulator 11 and a lower insulator 12 surrounding upper and lower portions of a stator core 10. A clutch housing combiner 30 is combined on the top of the upper insulator 11 of the stator assembly 1, and a waterproof cover 40 is combined with the clutch housing combiner 30 before a clutch housing is combined.

Referring to the stator assembly 1 shown in FIGS. 2 and 3, the stator assembly 1 has a shape including a plurality of teeth 10a formed on the outer periphery of the stator core 10 in a radial shape. The upper and lower portions of each tooth 10a are also surrounded by the upper and lower insulators 11 and 12. A coil (not shown) is wound around the upper and lower portions of each tooth 10a surrounded by the upper and lower insulators 11 and 12, and the ends of the wound coil are electrically connected to the hall sensor cover 20 side to be connected to an external power supply. Like this, the hall sensor cover 20 may play a role of connecting the external power supply to the coil, as well as including the hall sensors.

A fixing projection 11a and a hall sensor resting unit 11b are formed at the top end portions of two certain teeth placed below the hall sensor cover 20 and adjacent to each other. The fixing projection 11a is formed to fix the hall sensor cover 20, and the fixing projection 11a is coupled to a fixing hole 22a formed on the surface of a fixing leg 22 placed under the hall sensor cover 20 so that the hall sensor cover may be firmly fixed. Although it is shown in FIG. 3 that two fixing legs 22 and two fixing projections 11a are formed, they are not necessarily limited by two, but one or three or more fixing projects 11a and fixing legs 22 may be used as needed.

The hall sensor resting unit 11b is a place where a plurality of hall sensors 21 included in the hall sensor cover 20 is rested, which is formed at a portion of the upper insulator 11 surrounding an end portion of the tooth 10a of the stator core 10. Referring to FIG. 4, the hall sensor resting unit 11b is formed to place the bottom of the hall sensor 21 across the top surface of one end of the tooth 10a and the hall sensor resting unit 11b. In addition, the hall sensor resting unit 11b is formed to be projected from the front surface of one end portion of the upper insulator 11 toward the tooth. One or two hall sensors may be rested on the hall sensor resting unit 11b as shown in FIG. 3. Since a conventional hall sensor is installed in a slot, i.e., a space between the teeth, if it is assumed, for example, that three hall sensors are applied to a stator core having eighteen slots, a mechanical angle of 20 degrees is formed while an electrical angle of 120 degrees is maintained. If two hall sensors among the three hall sensors are rested on the top of a tooth and the other hall sensor is rested on the top of an adjacent tooth by applying a structure of resting a hall sensor on the top of an end portion of a tooth as shown in the present invention, it is possible to apply the hall sensors at a mechanical angle of 10 degrees while maintaining the same electrical angle of 120 degrees. Accordingly, if the structure according to the present invention is applied, it is advantageous in that the sizes of the hall sensor cover 20 and the stator assembly 1 can be reduced.

Referring to FIG. 2 again, the clutch housing combiner 30 is combined above the upper insulator 11. The clutch housing combiner 30 is formed to install a clutch for driving the washing tub, and the clutch housing combiner 30 of the present invention has a structure of combining the waterproof cover 40 with a plurality of combining projections 31.

Figure 5:
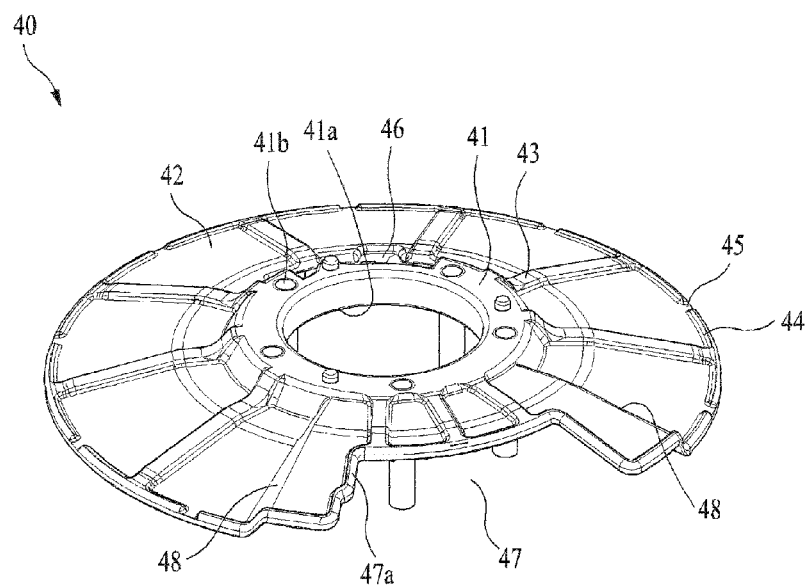
FIG. 5 is a perspective view showing a waterproof cover combined with a stator assembly of the present invention.

FIG. 5 is a perspective view showing a waterproof cover 40 combined with a stator assembly 1 of the present invention.

Referring to FIG. 5, the waterproof cover 40 of the present invention includes a flange unit 41 having a hollow section 41a and combining holes 41b formed at the center and a cover unit 42 formed around the flange unit 41 in the shape of a disk. The combining hole 41b is a part into which the combining projection 31 formed at the clutch housing combiner 30 is inserted to be combined. The cover unit 42 has a structure in which the height of the cover unit 42 decreases from the center, i.e., from the flange unit 41, toward the outer periphery. Accordingly, water falling around the flange unit 41 flows toward the outside of the circumference of the waterproof cover 40.

As described above, the diameter of the waterproof cover 40 is set to be larger than the diameter of the rotor housing 50. It is since that even when the water falling onto the waterproof cover 40 is drained toward the outside of the circumference of the waterproof cover 40, the water can be prevented from flowing into the rotor housing 50.

A plurality of ribs 43 is formed on the cover unit 42 in a radial shape. The ribs 43 are formed to reinforce the cover unit 42 of the waterproof cover 40 to maintain a shape having a slope declined toward the outer circumference and to increase strength of the waterproof cover 40. A plurality of drain guides 44 is formed at the outer circumference of the cover unit 42 along the outer periphery, and a drain channel 45 is formed between two adjacent drain guides 44.

The drain guide 44 performs a function of guiding flow of water so that the falling water may be drained through the drain channel 45.

A clutch lever penetration hole 46 for passing a clutch lever may be formed at the cover unit 42, and an opening section 47 is formed at a portion of the cover unit 42 so that the hall sensor cover 20 of the stator assembly 1 may be exposed.

The portions surrounding the opening section 47 of the cover unit 42 are formed to be higher than the cover unit 42 so that the hall sensor cover 20 may be exposed through the opening section 47. To this end, slope units 48 are formed at the cover units 42 around the opening section 47. Accordingly, water falling around the opening section 47 flows toward the cover unit 42 placed at a lower position through the slope units 48. Since an opening section drain guide 47a is formed along the edges of the opening section 47 to flow the water around the opening section 47 to both sides of the opening section 47, the water is prevented from flowing into the opening section 47.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A motor, comprising:
a stator core having a plurality of teeth formed in a radial shape and an upper insulator and a lower insulator surrounding an upper portion and a lower portion of the stator core;

a hall sensor cover having a plurality of hall sensors and being combined on an upper end portion of the teeth, a hall sensor resting unit for resting lower end portions of the hall sensors is formed adjacent to the upper end portion of the teeth so that each of the hall sensors is rested on both the upper end portion of the teeth and the hall sensor resting unit; and a waterproof cover being combined on a top of the upper insulator, the waterproof cover comprising, a flange unit having a hollow section at a center, a cover unit formed around the flange unit to have a shape declined toward an outer circumference, and an opening section opened to expose the hall sensor cover is formed at one side of the cover unit.

2. The motor according to claim 1, wherein at least one fixing leg is formed under the hall sensor cover, and a fixing projection is formed on at least one upper end portion of the tooth, wherein the fixing projection is coupled to a fixing hole formed at the fixing leg.

3. The motor according to claim 1, further comprising a plurality of ribs formed to be projected on the cover unit toward the outer circumference.

4. The motor according to claim 1, further comprising a plurality of drain guides formed to be projected along the outer circumference of the cover unit, wherein a drain channel is formed between the drain guide and an adjacent drain guide.

\* \* \* \* \*